(12) United States Patent
Nguyên et al.

(10) Patent No.: US 8,623,134 B2
(45) Date of Patent: *Jan. 7, 2014

(54) PROCESS FOR PRODUCING A GRANULAR MATERIAL

(75) Inventors: Evelyne Nguyên, Sint-Lambrechts-Woluwe (BE); Dirk Van Mechelen, Tisselt (BE); Philippe Descamps, Ham-sur-Heure (BE)

(73) Assignee: Recoval Belgium, Farciennes (BE)

( * ) Notice: Subject to any disclaimer, the term of this patent is extended or adjusted under 35 U.S.C. 154(b) by 88 days.

This patent is subject to a terminal disclaimer.

(21) Appl. No.: 12/812,912

(22) PCT Filed: Jan. 15, 2009

(86) PCT No.: PCT/EP2009/050433

§ 371 (c)(1),
(2), (4) Date: Oct. 13, 2010

(87) PCT Pub. No.: WO2009/090219

PCT Pub. Date: Jul. 23, 2009

(65) Prior Publication Data

US 2011/0017101 A1 Jan. 27, 2011

(30) Foreign Application Priority Data

Jan. 15, 2008 (WO) ................. PCT/EP2008/050411

(51) Int. Cl.
*C04B 18/14* (2006.01)

(52) U.S. Cl.
USPC .......................................... 106/789; 264/117

(58) Field of Classification Search
USPC .................... 106/713, 789; 264/117
See application file for complete search history.

(56) References Cited

U.S. PATENT DOCUMENTS 5,421,880 A * 6/1995 Young ........................ 106/756
6,196,479 B1 * 3/2001 Edlinger ......................... 241/1

(Continued)

FOREIGN PATENT DOCUMENTS

EP 1420000 5/2004
GB 2140795 12/1984

(Continued)

OTHER PUBLICATIONS

International Search Report and Written Opinion, PCT/EP2009/050433, Jun. 26, 2009.

(Continued)

*Primary Examiner* — Paul Marcantoni
(74) *Attorney, Agent, or Firm* — McCracken & Frank LLC (57) ABSTRACT

The present invention relates to a process for producing a granular material 26 for mixing with at least a hydraulic binding agent and with water to produce mortar or concrete. This process comprises at least an aggregation step and a carbonation step. In the aggregation step, steel slag particles from at least a fine fraction 24 of steel slag, in particular a fine fraction of steel slag containing a significant amount of γ-dicalcium silicate, are aggregated into larger grains so as to form a coarser granular material 25. In the carbonation step, said aggregated particles in said coarser granular material 25 are carbonated by means of carbon dioxide so as to produce a carbonated granular material 26. The present invention also relates to a carbonated granular material of aggregated steel slag particles containing a significant amount of γ-dicalcium silicate, in particular at least 3 wt. %, preferably at least 5 wt. % and more preferably at least 7 wt. %, and bound within each grain by a solid matrix containing at least calcium and/or magnesium carbonates.

22 Claims, 5 Drawing Sheets

(56) References Cited

U.S. PATENT DOCUMENTS

| | | | |
|---|---|---|---|
| 2011/0023659 A1* | 2/2011 | Nguy n et al. | 75/392 |
| 2011/0165400 A1* | 7/2011 | Quaghebeur et al. | 428/220 |

FOREIGN PATENT DOCUMENTS

| | | |
|---|---|---|
| JP | 63242950 | 10/1988 |
| JP | 2001026470 | 1/2001 |
| JP | 2004051425 | 4/2002 |
| JP | 2003212617 | 7/2003 |
| WO | 2005/035462 | 4/2005 |

OTHER PUBLICATIONS

Kondo, et al., New Material Obtained by Carbonation of LD Slag, Chemical Abstracts, vol. 87(4), Jul. 25, 1977.

* cited by examiner

PROCESS FOR PRODUCING A GRANULAR MATERIAL

The present invention relates to a process for producing a granular material for mixing with at least a hydraulic binding agent and with water to produce mortar or concrete.

The steel industry produces large amounts of waste materials, in particular in the form of steel slag. The disposal of that waste is a significant problem, in particular for steel slag containing pollutants such as heavy metals, e.g. chromium, nickel, or molybdenum, and/or halogens, e.g. fluorine, which could constitute a significant environmental and health hazard, should they leach out into the environment, and in particular into water supplies and/or the food chain.

Granulated Blast Furnace Slag (GBFS), mainly formed by an amorphous phase of a mixture of calcium, silicon, aluminum and magnesium oxides formed after rapidly quenching the molten slag, at least can be used as a coarse aggregate in concrete compositions, or, in finely ground form (GGBFS), as a cement substitute. However, the fine fraction of slowly-cooled and therefore mainly crystalline slag has shown until now extremely negative properties of water absorption. Such slag contains γ-dicalcium silicate, which has no binding properties, but on the other hand can absorb large quantities of water. This has deleterious effects, for instance, for the workability and durability of concrete if this slag is used as fine aggregate (i.e. as sand) or filler. As the γ-dicalcium silicate absorbs much of the water poured into the concrete mix, this fails to become fluid enough to be effectively poured, impairing its workability. Moreover, as the water trapped in the slag is released during the concrete setting process, it may form small voids to the detriment of its strength and durability.

At ambient temperature, crystalline lime-silicate slag generally comprises crystals of dicalcium silicate $(CaO)_2SiO_2$ in both their β and γ polymorphic states. As molten dicalcium silicate slowly cools down and solidifies, it goes through several polymorphic forms:

α with hexagonal crystal structure,
$α_H'$ with orthorhombic crystal structure,
$α_L'$ with orthorhombic crystal structure,
β with monoclinic crystal structure, and
γ with orthorhombic crystal structure.

As the last transition is linked to an increase of approximately 12% in volume, it causes high strains and microcracks in the dicalcium silicate crystals of the orthorhombic γ polymorphic state. These microcracks explain the disadvantageous water absorption properties that had been found hitherto in slag containing γ-dicalcium silicate, as water is absorbed by capillarity into them.

The increase in volume in the transition from the β polymorphic state to the γ polymorphic state not only causes microcracks but even grain fracture and separation. As a result, the fine fraction of the slag will be disproportionately rich in comparatively soft γ-dicalcium silicate. Due to the abovementioned microcracks and the associated capillarity, this fine fraction of the slag will have a water absorption capacity of over 35%. Moreover, under comparatively humid conditions, it can retain this water for longer periods of time.

In the article "The use of stainless steel slag in concrete", A. Kortbaoui, A. Tagnit-Hamou, and P. C. Aïtcin, Cement-Based Materials, p. 77-90, 1993, a process for producing mortar or concrete was proposed comprising the step of mixing at least a fine fraction of steel slag particles, containing a significant amount of γ-dicalcium silicate, with at least a hydraulic binding agent and with water to produce said mortar or said concrete. However, the amount used was limited by the negative effect of that fine fraction on the workability of the cement mix. Since the fine steel slag fraction can absorb large quantities of water, using the normal amounts of water in the mixture will result in a thick, nearly solid paste. In particular, this negative impact on the workability of the cement mix would make it inadequate for use in self-compacting concrete, as defined by the European Guidelines for Self-Compacting Concrete, published by the European Precast Concrete Organization, the European Cement Association, the European Ready-mix Concrete Organization, the European Federation of Concrete Admixture Associations and the European Federation of Specialist Construction Chemicals and Concrete Systems. Adding more water, however, will have a negative impact in the strength of the concrete, since a water film forms around each steel slag particle which will leave a void once the concrete hardens. Attempts to compensate this by adding plasticizer or cement will increase the cost.

Moreover, in concrete production facilities, the water which is adsorbed onto the particles of the fine and coarse aggregates (since this water is readily available in the mortar or concrete mix) is taken into account when weighing the different ingredients of the concrete or mortar to be prepared but not the amount of water which is absorbed more strongly within these aggregates. The adsorbed water is more particularly determined by determining the "surface dry" density of the aggregates and by calculating the difference between the actual density of these aggregates and the "surface dry" density thereof. When the steel slag particles are dry, they absorb much water from the concrete or mortar composition thus resulting as explained hereabove in a bad workability. On the other hand, since the amount of water absorbed in the steel slag particles has a big effect on the density of the steel slag particles, the use of dry or wet steel slag particles will moreover have a considerable effect on the concrete or mortar composition as the different components are weighted. Our tests have revealed that the fine fraction of unquenched slag may absorb more than 35% by weight of water (determined on the basis of the "surface dry" weight, i.e. not including any water adsorbed onto the slag particles), whereas, after drying at 42° C., the water content may be less than one tenth of that. This results in a very broad water content range under real, rather than laboratory, conditions which in practice makes it very difficult to maintain consistent material parameters under various weather conditions, especially since the content of water absorbed within the slag particles in not taken into account when weighing the concrete or mortar ingredients. A drawback of a high water absorption is that the specific weight increase of water-saturated slag and the mortar or concrete mixes containing them results in higher transport costs and requires stronger casings when casting concrete.

Also, the water absorbed within the slag particles may form pockets in the concrete or mortar containing them. These water pockets can render the finished material more vulnerable to frost. Finally, since slag may contain heavy metals, leaching remains a significant problem.

In EP 1 420 000, a fine fraction of unquenched slag containing γ-dicalcium silicate has been used not as sand but as cement admixture. In this way, the amount of water is adjusted to the amount of slag. However, the tests in that disclosure show a rapid decrease in compressive strength of the resulting mortar with an increasing slag/cement ratio. The use of such fine slag material is thus limited to comparatively small amounts as a cement admixture representing only a small fraction of the total weight of the resulting mortar or concrete.

For all these reasons, the fine fraction of unquenched slag containing γ-dicalcium silicate has proved, until now, very difficult to recycle.

The problem addressed by the present invention is thus that of reducing the water absorption and leaching of heavy metals of a fine fraction of steel slag particles, containing a significant amount of γ-dicalcium silicate, so as to be able to increase the amount of this waste material that could be mixed with at least a hydraulic binding agent and water for producing mortar or concrete.

This problem is solved by a process comprising an aggregation step and a carbonation step. In the aggregation step, steel slag particles from at least a fine fraction of steel slag, in particular a fine fraction of steel slag containing a significant amount of γ-dicalcium silicate, are aggregated into larger grains so as to form a coarser granular material. In the following carbonation step, the aggregated particles in said coarser granular material are carbonated by means of carbon dioxide so as to produce a carbonated granular material.

By the combination of these steps, a material is obtained with a significantly lower water absorption and therefore significantly better workability when it is mixed with cement and water. The carbonation converts calcium and/or magnesium hydroxides into calcium and magnesium carbonate phases with binding properties that heal the microcracks in the fine steel slag particles, significantly reducing their water affinity, and bind them together within each grain, providing, already without any additional binder, a harder, coarser material than the original fine slag fraction with a much wider range of applications. The water content within these grains ("dry surface" water content) remains within a much narrower range throughout various different heat and humidity conditions, making its use in concrete and cement mixes much more practical under real conditions than that of untreated steel slag fines. Moreover, the carbonation step also provides with a means for capturing carbon dioxide which would otherwise be of concern due to its greenhouse effect, and traps the heavy metals within the grains, reducing the polluting leachate.

Although in the Japanese patent publication application JP 2001-026470 it was proposed to carbonate the surface of steel slag containing pollutants in order to entrap them and harden the surface of the steel slag, and use it as a building material, it was not considered to aggregate it first, or to mix it with an hydraulic binder and water to produce mortar or concrete. Moreover, since in the disclosed process the slag is carbonated only on the surface, its mechanical properties remain insufficient, and the contaminants can still leach out if the surface is broken.

In the paper "Accelerated carbonation of waste calcium silicate materials", presented at the Young Researchers Forum organized by the SCI Construction Materials Group and held 27 Apr. 2000, a process was proposed to carbonate a fine fraction of steel slag particles, containing a significant amount of γ-dicalcium silicate, in a mould, so as to produce a hardened construction material in the form of briquettes.

However, this process presents several disadvantages. First of all, due to the limited diffusion of the $CO_2$ within the mould, this process is only suitable for producing small precast construction parts. Moreover, even with such small parts, it is difficult to ensure that the material is carbonated evenly, usually leaving an insufficiently carbonated core with unsatisfactory mechanical and leaching properties.

As an alternative, in Japanese patent application publication JP 2003-212617, another process was proposed in which a fine fraction of steel slag particles, containing a significant amount of γ-dicalcium silicate, is mixed with a hydraulic binder and water in the mould before being carbonated. Since in this case the carbonation step is also carried out in the mould, after mixing the components, this process also presents the same drawbacks. It cannot be applied on-site, or for casting large parts in concrete, without complex carbonation equipment.

With the process of the invention, however, since its product is a loose granular material, it will be possible to carbonate the fine steel slag fraction in advance, and obtain a granular material which is easy to store and handle before it is mixed with the hydraulic binder and water in a conventional manner.

In the International patent application WO 2007/096671, a process had been proposed for producing mortar or concrete comprising the step of carbonating fine waste materials before mixing them with at least a hydraulic binding agent and with water. However, the waste materials mentioned are residues of quarrying and combustion processes, and it does not appear that it would have been evident for the skilled person that it would be advantageous, or even possible, to apply the same process to steel slag, and more specifically to a fine fraction of steel slag particles, containing a significant amount of γ-dicalcium silicate.

In the French patent application FR 2 735 767, a process has been described for producing concrete comprising the step of carbonating coarser steel slag particles in order to create a water-impervious layer around each particle, and prevent slow hydration and swelling of free lime within the slag particles once they are incorporated in the concrete so that a larger amount of these coarser slag particles can be incorporated in the concrete. However, the workability problem caused by water absorption by γ-dicalcium silicate is not addressed or even mentioned, especially not of a fine steel slag fraction which contains a significant portion of γ-dicalcium silicate and which can be used due to its particle size anyway only in quite small amounts in the concrete. This problem is however solved in the process of the present invention by the aggregation step to which the fine slag fraction is subjected. Moreover, the superficial carbonation of steel slag particles proposed in this French patent application is not a satisfactory solution to the problem of swelling, since the moisture retained at the core of the particles will cause some slow hydration anyway, which will swell the particles and crack the water-impervious layer, negating its benefits.

Advantageously, the water content of said larger grains during the aggregation step is controlled, so that, at the end of said aggregation step, it is within a range of 5 wt. %, preferably 3 wt. %, above or below the optimum water content resulting in a maximum dry density in a Proctor compaction test performed in accordance with ASTM D698/AASHTO T99 on the particles used to produce the larger grains. The Proctor density, that is, the dry density of a powdery or granular material measured according to a Proctor compaction test, indicates how closely its particles are packed and varies according its water content. It is thus possible, with Proctor tests at various moisture levels on the steel slag particles used in the process, to determine at which water content the particles will be more densely packed. By controlling the water supply before and/or during the aggregation step, or if necessary by drying the material, so as to obtain approximately the same water content in the granular material, it is possible to achieve the same optimum packing within the grains. More densely packed particles within the grains will result in harder grains after carbonation, with more strongly bonded particles. Within these ranges of water content values, it will thus be possible to achieve better density, packing and interface cohesive strength of the particles within each grain in the granular material. Moreover, additional water absorption will be reduced, which will improve the workability of the mixture with a hydraulic binder and water.

Advantageously, the steel slag particles may have sizes not larger than x, said x being not larger than 4 mm, preferably not larger than 3 mm, more preferably not larger than 2 mm, and most preferably not larger than 1 mm. The steel slag particles of those sizes can be particularly rich in γ-dicalcium silicate, and thus more difficult to recycle by other means.

Advantageously, the grains of the coarser granular material may have sizes up to and including y, y being larger than 2×, preferably larger than 3×, more preferably larger than 4× and most preferably larger than 5×. Such a coarser granular material can be more useful in a concrete mixture than finer particles, offer better flowability and workability, yet still be easy to store and handle as a loose material before the mixing step.

However, y may be preferably smaller than 25 mm, preferably smaller than 20 mm and more preferably smaller than 15 mm. Since the carbonation step takes place after said aggregation step, this facilitates a more complete carbonation of the coarser granular material than if said grain size was larger.

Advantageously, said coarser granular material may be agitated during said carbonation step, preferably in a substantially continuous manner. An improved, more homogeneous carbonation can be achieved in this manner.

Advantageously, a hydraulic binder, in particular ordinary Portland cement (OPC), may be added to said steel slag particles prior to and/or during said aggregation step, in particular with a weight ratio to the steel slag particles between 1 and 10%. Besides an increase in the mechanical strength of the carbonated granular material and concrete and/or mortar thus obtained, use of this additive also has surprisingly positive consequences in further suppressing the leaching out of chromium and molybdenum from the carbonated granular material.

Advantageously, said carbonated granular material may contain at least 2 wt. %, even more preferably at least 3 wt. % and most preferably at least 4 wt. % of carbonates produced during the carbonation step. A good cohesion of the aggregated solid slag particles in each grain is thus ensured.

Advantageously, said carbonation step may be performed in a continuous counter current flow process. Also, advantageously, said carbonation step may be artificially accelerated, for example, by carbonating with a gas, such as for instance a flue gas, comprising at least 5 vol. %, preferably at least 8 vol. % and more preferably at least 10 vol. % carbon dioxide. Both these features help achieving a more complete carbonation of the steel slag particles. Carbonating with industrial flue gases moreover provides an advantageous use to carbon dioxide that normally would otherwise be directly emitted into the atmosphere as a greenhouse gas.

Preferably, after said carbonation said gas may still be used to reduce the alkalinity of effluent waters having a pH higher than 11. Handling steel slag, in particular when cooling them and crushing and sieving them, often produces, as a waste product, such highly alkaline effluent waters, with a high content in calcium, sodium, magnesium and/or potassium ions. Bubbling this gas through such effluent waters will further reduce its carbon dioxide content, while simultaneously reducing their alkalinity, reducing the environmental impact of both.

Advantageously, said gas may comprise less than 30 vol. %, preferably less than 25 vol. % and more preferably less than 20 vol. % carbon dioxide. Also advantageously, said carbonation step may be performed at a temperature of between 10 and 100° C., in particular at a temperature lower than 80° C., and more particularly at a temperature lower than 60° C. This corresponds to the carbon dioxide content and temperature of flue gasses from a wide range of industrial processes, thus allowing the use of the process of the invention for carbon dioxide capture in those industrial processes with a minimum of special arrangements.

Advantageously, said carbonation step may be performed at a pressure lower than 10 bars and preferably substantially at ambient pressure. Besides requiring less complex installations, and lower energy consumption, it has been found by the inventors that, surprisingly, such low pressure carbonation has positive effects on the strength of the carbonated steel slag and, above all, on its leaching behaviour. Presumably, a low pressure promotes crystal growth instead of crystal nucleation, this latter being known to give rise to very small carbonate crystals characterized by poor binding properties. Apparently, low-pressure carbonation produces larger carbonate crystals, which strengthen the steel slag particles, and also entrap heavy metals, such as chromium or molybdenum, within the particles. Moreover, at such low pressures, the carbonation of silicate phases present in eventually added cement remains limited. Such a carbonation of the silicate phases (e.g. alite, belite) could cause a drop in the pH value, which in turn could possibly reduce the retention of heavy metals.

Advantageously, said steel slag particles may comprise in particular at least 3000 ppm, more particularly at least 5000 ppm of chromium. Stainless steel slag normally contains significant amounts of heavy metals, complicating its disposal for environmental and public health reasons. By the process of the invention, it is possible to productively use this otherwise troublesome waste as secondary material, e.g. synthetic sand, for the production of mortar or concrete exhibiting satisfactory retention of those heavy metals. In particular, the process of the inventions appears to be particularly advantageous for the treatment of a fine stainless steel slag fraction comprising at least 100 ppm, in particular at least 1000 ppm, and more particularly at least 2500 ppm of molybdenum. Such high molybdenum concentrations are becoming increasingly common in stainless steel slag due to quality requirements, and until now have further complicated the disposal of such slag.

Advantageously, a water soluble barium compound, such as, for example, barium hydroxide, barium chloride, and/or their byproducts, may be added to the steel slag particles prior to said carbonation step. Such an additive further decreases the leaching out of heavy metals, such as chromium and molybdenum, from the product of the method of the invention.

Advantageously, a base, in particular sodium and/or potassium hydroxide, is added to the steel slag particles prior to said carbonation step, in order to counteract the pH decrease due to carbonation and, if possible, buffer the carbonated steel slag particles at a pH higher than 11.5, more particularly higher than 12. It has been found that the chromium and molybdenum leaching is lowest if the pH is maintained roughly above 12, in particular between 12 and 13. Moreover, this additive has also been found to facilitate the hydration of amorphous calcium and magnesium oxides in said fine steel slag fraction.

Advantageously, said steel slag particles may contain at least 3 wt. %, preferably at least 5 wt. % and more preferably at least 7 wt. % of γ-dicalcium silicate.

The present invention also relates to a carbonated granular material produced according to the process of the invention, as well as to a carbonated granular material of aggregated steel slag particles containing a significant amount of γ-dicalcium silicate, in particular at least 3 wt. %, preferably at least 5 wt. % and more preferably at least 7 wt. %, and bound within each grain by a solid matrix comprising at least calcium and/or magnesium carbonates.

Advantageously, said steel slag particles may be packed within each grain with a packing density not lower than 5% less than the maximum Proctor density, as determined by Proctor compaction tests according to ASTM D698/ AASHTO T99 carried out on said steel slag particles.

Advantageously, the carbonated granular material may have a bulk density lower than 1800 kg/m$^3$, preferably lower than 1600 kg/m$^3$ and more preferably lower than 1500 kg/m$^3$. While it is advantageous, under most circumstances, to achieve as close and dense a packing as possible, the carbonated granular material thus obtained will remain a lightweight aggregate, which presents advantages of its own in its use in concrete and mortar mixtures, such as that of allowing the building of strong, yet lightweight structures.

The present invention also relates to process for producing mortar or concrete by mixing the carbonated granular material with at least a hydraulic binding agent and with water.

When weight percentages are given in the present specification, these are percentages by dry weight.

A particular embodiment of the invention will now be described illustratively, but not restrictively, with reference to the following figures.

Figure 1:
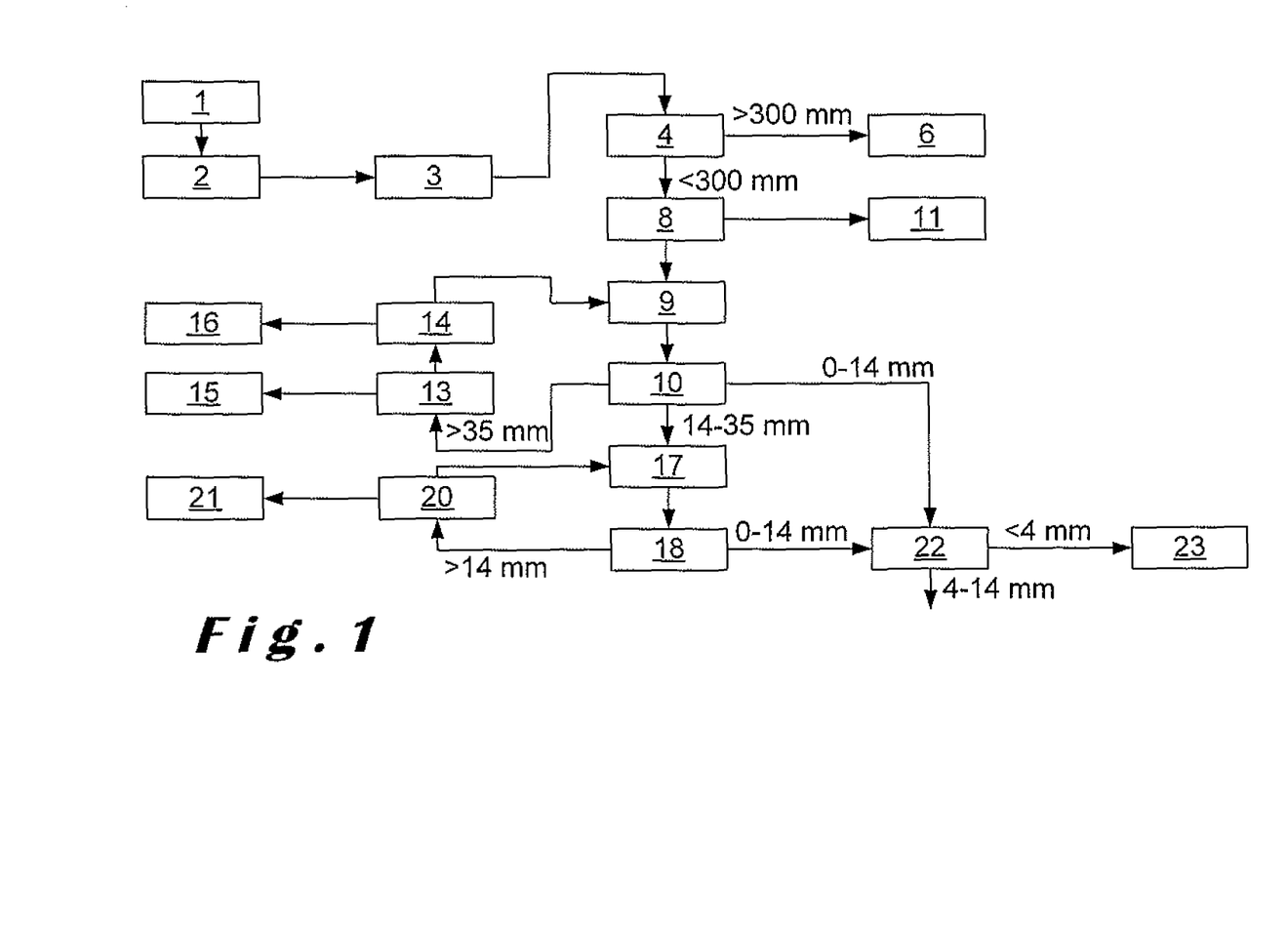
FIG. 1 is a flow chart representing a process for separating a fine stainless steel slag fraction for use with a particular embodiment of the method of the invention.
Figures 2, 3:
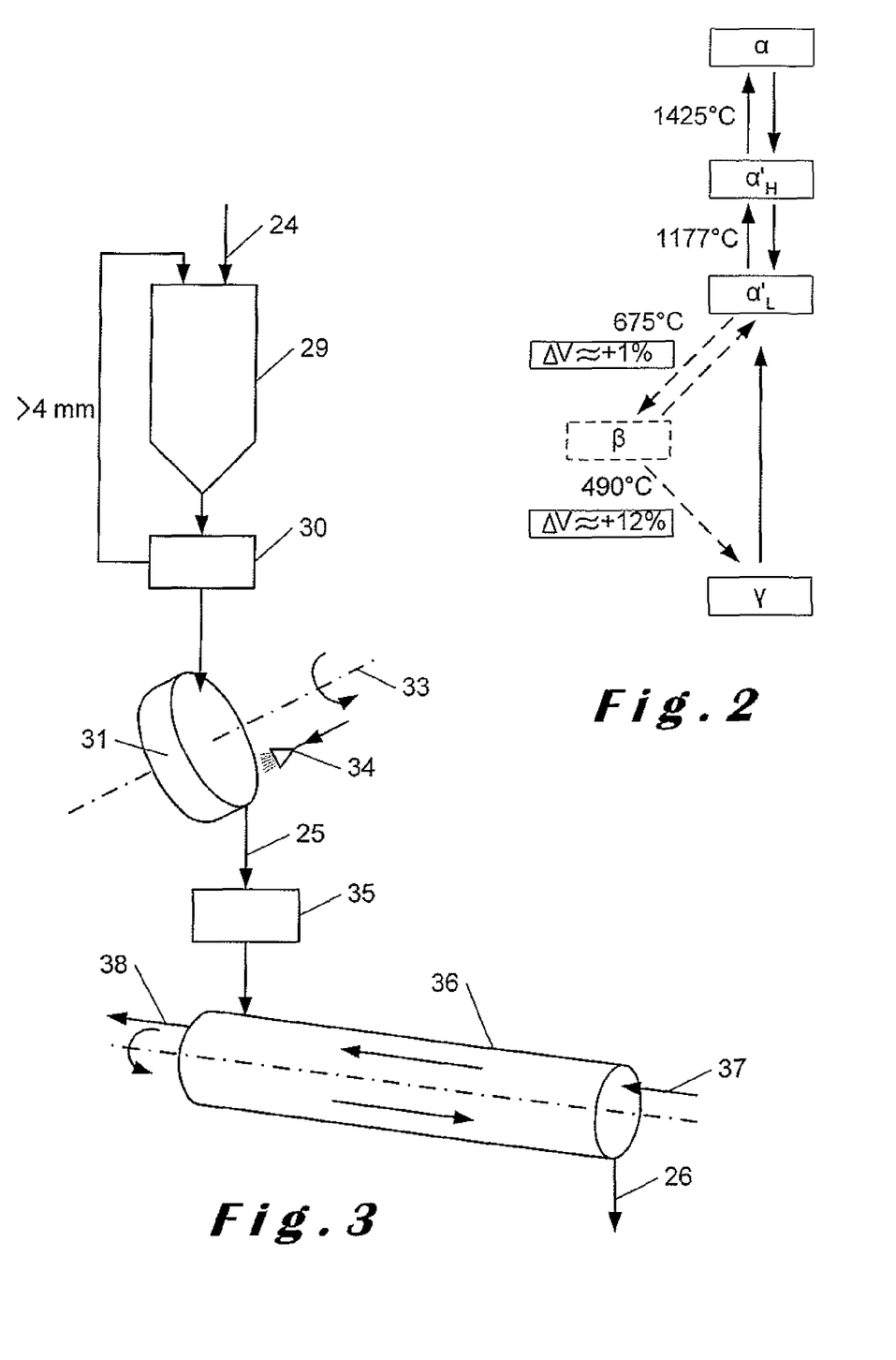
FIG. 2 is a diagram representing the phase transitions during the cooling of dicalcium silicate.
FIG. 3 is a schematic diagram representing a particular embodiment of the method of the invention.
Figure 4:
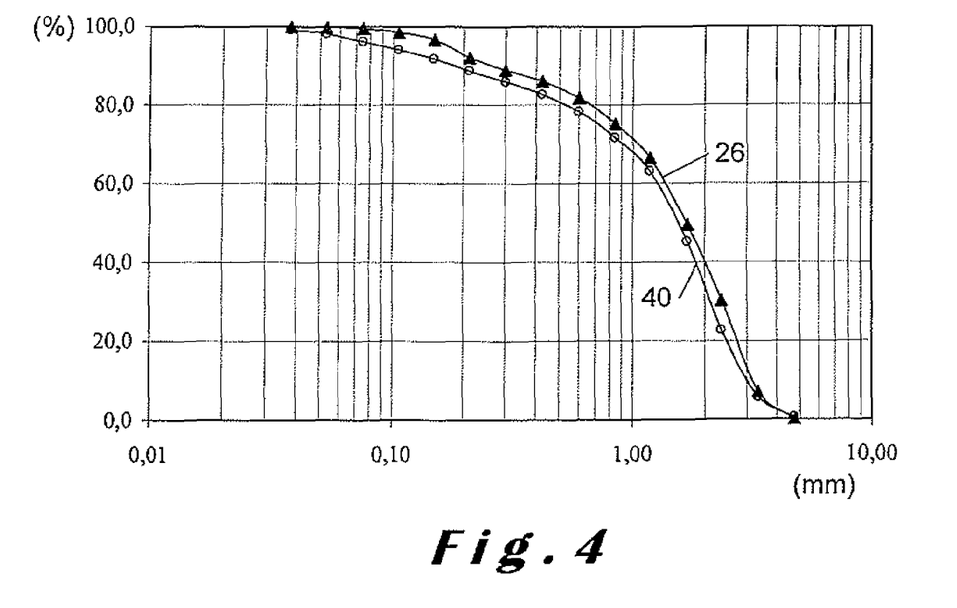
FIG. 4 represents comparative grain size distribution curves.

FIG. 1 illustrates a process for separating a fine fraction of stainless steel slag particles. This fine fraction is rich in γ-dicalcium silicate, and presents water absorption properties that normally prevent it being used in mixtures with hydraulic binding agents, such as ordinary Portland cement. In this separation process, the molten lime-silicate slag of a stainless steel furnace 1 is emptied in buckets 2, and transported in these buckets 2 to cooling pits 3, in which it is left to slowly cool and solidify. As the cooling is comparatively slow, the slag will not solidify nearly entirely in an amorphous phase, like GBFS, but to a large extent in crystalline phases instead. A significant component of lime-silicate slag is dicalcium silicate (CaO)$_2$SiO$_2$. As crystalline dicalcium silicate cools down, it goes through several polymorphic forms as illustrated in FIG. 2:

α with hexagonal crystal structure,
α$_H$' with orthorhombic crystal structure,
α$_L$' with orthorhombic crystal structure,
β with monoclinic crystal structure, and
γ with orthorhombic crystal structure.

With pure dicalcium silicate under laboratory conditions, the transition from α$_L$'-dicalcium silicate to β-dicalcium silicate will occur at 675° C., then to be followed by the transition from β-dicalcium silicate to γ-dicalcium silicate at 490° C. As the transition from β-dicalcium silicate to γ-dicalcium silicate involves an increase of 12% in volume due to their different crystal structure, it will break up the dicalcium silicate crystals. This pulverizes a fraction of the slag. The transition also causes microcracks in the fine γ-dicalcium silicate grains, which appears to explain why this fine dust can absorb and retain large quantities of water. These water absorption properties make this fine γ-dicalcium silicate dust highly unsuitable for most uses in construction.

Since even with the addition of chemical stabilizers and other measures known to the skilled person, it appears very difficult to completely prevent the formation of γ-dicalcium silicate in mainly crystalline lime-silicate slag, and since in any case these measures could interfere with the economical operation of the furnace 1, it has been proposed to extract a fine fraction of the slag, because, due to the grain fracture linked to the γ-β transition, this fine fraction is enriched in γ-dicalcium silicate.

In the process illustrated in FIG. 1, molten slag is extracted from the stainless steel furnace 1 and brought to cooling pits 3. After cooling, the solidified slag will be dug from these cooling pits 3 and fed through a hopper 4. The hopper 4 comprises a grid for stopping all oversized slag pieces 6, in this particular case those bigger than 300 mm. As oversized pieces could damage the crushers used in the later process, these oversized pieces 6 are removed for later particular treatment, such as breaking with hammers and extraction of large metal fragments before being fed again through the hopper 4.

The slag particles smaller than 300 mm fall through the hopper 4 onto a first conveyor belt. This first conveyor belt then transports them through a first metal handpicking cabin 8 to a first crusher 9 and a first sieve 10. In the metal handpicking cabin 8, operators remove large metal pieces 11 from the slag particles on the conveyor belt 7. After the slag particles are crushed in the first crusher 9, they go through the first sieve 10 which separates them into three fractions: particles bigger than 35 mm, particles between 14 and 35 mm and particles smaller than 14 mm. The fraction of particles bigger than 35 mm is taken by a second conveyor belt through a second metal handpicking cabin 13 and a first metal separating magnetic belt 14, where more metal pieces 15 and 16 are removed. The particles bigger than 35 mm are then put back into the first crusher 9. The fraction of particles between 14 and 35 mm goes into a second crusher 17 and a second sieve 18, where after being crushed again it is separated into two fractions: a fraction of particles smaller than 14 mm and a fraction of particles bigger than 14 mm. The fraction of particles bigger than 14 mm is taken by a third conveyor belt through a second metal separating magnetic belt 20, where more metal 21 is removed, and back into the second crusher 17.

The fraction of particles smaller than 14 mm from the first sieve 10, and the fraction of particles smaller than 14 mm from the second sieve 18 join again and are put together through the third sieve 22, which separates them into a fraction 23 of particles smaller than 4 mm and a fraction of particles between 4 and 14 mm.

Within this fraction 23 of particles smaller than 4 mm, a fine fraction 24 of particles smaller than 0.5 mm is particularly rich in γ-dicalcium silicate, and is therefore used in a particular embodiment of the process of the invention, illustrated in FIG. 3.

In this process, the particles in said fine stainless steel slag fraction 24 are first aggregated to form a coarser granular material 25 with a granulometry between 0 and 4 mm, and then carbonated. The carbonated granular material 26 can then be used in a concrete mix with at least a hydraulic binder 27, such as ordinary Portland cement, and water 28, and this as a substitute, for example, of [0-4 mm] porphyry sand. However, since the particles in the fine fraction 24 can form large clods during storage, in particular in the open, in this particular embodiment, a first breaking up step is carried out on those clods before the aggregation step. For this purpose, the fine fraction 24 is dried, then fed through a hopper 29 into a rotary harrow 30, and sieved to remove any remaining clods larger than 4 mm, which are then fed back into the hopper 29.

After this breaking up step, the fine fraction 24 is fed into a disc or pan pelletizer 31, in which the slag particles of the fine fraction 24 are aggregated into a coarser granular material 25 by the rotation of an inclined disc or pan around its main axis 33. Water 34 is sprayed onto the pelletizer 31 for the aggregation of the slag particles. For this, highly alkaline effluent waters from the previous slag treatment steps may be used. To improve the retention of chromium and molybdenum in the finished product, barium hydroxide may be dissolved into this water 34 in a concentration of, for example, 0.05-0.5 mole/l, preferably 0.1-0.2 mole/l. However, alternative water-soluble barium compounds, such as barium chloride, may be considered instead, or barium compounds may dispensed with altogether, in particular when chromium and molybdenum leaching is not a particular concern. The purpose of introducing such a barium compound is to form barium molybdate $BaMoO_4$ in the slag particles. Not only has this barium molybdate a low solubility in water, and this even in strongly basic conditions, it also promotes the immobilization of chromium ions. Furthermore, the addition of water-soluble barium compounds could eventually be expected to improve the mechanical properties of mortar and/or concrete containing the carbonated granular material 26.

Fresh steel slag usually contains calcium and magnesium oxides. For a more complete carbonation of the slag, these oxides can be hydrated to convert them into carbonatable calcium and magnesium hydroxides. In this particular embodiment, the fine fraction 24 is stored in the open for some time before the aggregation and carbonation steps, so that at least a partial hydration happens naturally due to ambient moisture. If the fine steel slag fraction is however so fresh that it has not yet been substantially hydrated by the ambient moisture, it may be advantageous to also dissolve other additives, such as calcium and/or magnesium acetate and/or salts, such as, in particular, calcium chloride, in the water 34 in order to accelerate this hydration reaction. Tables 1 to 4 show the results of hydration tests on calcinated (and thus substantially calcium and magnesium hydroxide-free) samples of the fine fraction 24:

TABLE 1

Hydration with 20 wt. % pure water

| Hydration time [min] | $Mg(OH)_2$ [wt. %] | $Ca(OH)_2$ [wt. %] | Total hydroxides [wt. %] |
|---|---|---|---|
| 43 | 0.00 | 0.00 | 0.00 |
| 236 | 0.00 | 0.00 | 0.00 |
| 514 | 0.08 | 0.14 | 0.22 |
| 3000 | 0.11 | 0.10 | 0.21 |

TABLE 2

Hydration with 20 wt. % of an aqu. solution of 0.5M Mg acetate

| Hydration time [min] | $Mg(OH)_2$ content [wt. %] | $Ca(OH)_2$ content [wt. %] | Total hydroxides [wt. %] |
|---|---|---|---|
| 105 | 0.89 | 0.47 | 1.20 |
| 320 | 0.78 | 0.63 | 1.41 |
| 1080 | 0.73 | 0.32 | 1.23 |
| 2653 | 0.86 | 0.40 | 1.26 |
| 4379 | 0.76 | 0.53 | 1.30 |

TABLE 3

Hydration with 20 wt. % of an aqu. solution of 0.5M Ca acetate

| Hydration time [min] | $Mg(OH)_2$ content [wt. %] | $Ca(OH)_2$ content [wt. %] | Total hydroxides [wt. %] |
|---|---|---|---|
| 86 | 1.34 | 0.08 | 1.42 |
| 163 | 1.09 | 0.80 | 1.89 |
| 829 | 1.07 | 1.01 | 2.08 |
| 1276 | 1.11 | 0.89 | 2.00 |
| 1914 | 1.02 | 0.91 | 1.93 |

TABLE 4

Hydration with 20 wt. % of an aqu. solution of 0.5M $CaCl_2$

| Hydration time [min] | $Mg(OH)_2$ content [wt. %] | $Ca(OH)_2$ content [wt. %] | Total hydroxides [wt. %] |
|---|---|---|---|
| 84 | 0.00 | 0.00 | 0.00 |
| 776 | 0.00 | 0.61 | 0.61 |
| 1464 | 0.30 | 0.87 | 1.17 |
| 3113 | 0.16 | 0.72 | 0.88 |

As can be seen from these results, such additives, dissolved in aqueous solutions can significantly accelerate the hydration of calcium and magnesium oxides to form hydroxides in the fine steel slag fraction 24.

If the rotation speed and inclination of the pelletizer 31 are kept constant, the grain size of the coarser granular material 25 obtained in this aggregation step can be roughly controlled by regulating the flow of water 34 and the residence time of the slag particles in the pelletizer 31. After being removed from the pelletizer 31, the granular material 25 is fed into sieve 35 to remove oversize grains, in this particular embodiment those over 4 mm. Eventually, a fine sieve could also be used to remove undersize grains, for instance those under 1 mm.

Through the flow of water 34 it is also possible to control the water content of the grains of aggregated fine steel slag particles obtained in this way, and, through it, their Proctor density and packing. By "Proctor density", it is understood the compacted dry volumic mass of these aggregates, as determined, for example, but not necessarily, by the original Proctor compaction test, as described in ASTM D698/AASHTO T99, which is incorporated by reference, and uses a 4-inch (10.2 cm) diameter mould which holds 1/30th cubic foot (850 cm$^3$) of granular or powdery matter, and calls for compaction of three separate lifts of this granular or powdery matter using 25 blows by a 5.5 lb (2.49 kg) hammer falling 12 inches (30.5 cm). For this particular embodiment of the process of the invention, the results of original Proctor compaction tests carried out on samples of the fine steel slag fraction 24, and presented in Table 5, have shown a water content of around 22 wt. % to be approximately that ensuring the highest density packing of the steel slag particles of this 0-0.5 mm fraction 24:

TABLE 5

Proctor density in relation to water content of 0-0.5 fraction

| Water content [wt. %] | 13.5 | 16.7 | 18.8 | 22.7 | 25.8 |
|---|---|---|---|---|---|
| Dry density [kg/m3] | 1625 | 1685 | 1690 | 1700 | 1625 |

It must be noted that the water content corresponding to the highest Proctor density will vary with the mineralogy and size distribution of the particles. For example, tests adding increasing amounts of particles in the 0.5-2 mm fraction of the same slag to the 0-0.5 mm fraction 24 and shown in Table 6 have found steadily decreasing water contents for the optimal Proctor density:

TABLE 6

Water content for maximum Proctor density

| 0-0.5 mm [wt. %] | 0.5-2 mm [wt. %] | Opt. moisture [wt. %] |
|---|---|---|
| 100 | 0 | 22 |
| 75 | 25 | 17 |
| 50 | 50 | 14 |
| 25 | 75 | 11 |

The water content will also be important for the carbonation of the particles, by facilitating the transport of the carbon dioxide reacting with the particles.

In the next step, this coarser granular material 25 is carbonated. In a particular embodiment, this carbonation step may be carried out in a continuous manner, for instance within an inclined rotating drum 36 with a flue gas supply 37, and a flue gas exhaust 38. The granular material 25 is conveyed by gravity against the flow of flue gas in the drum 36. Said flue gas may be provided by, for instance, an incinerator, a power plant, a blast furnace or a cement kiln, at substantially atmospheric pressure and a temperature of around 50° C., with about 10 vol. % $CO_2$ and a humidity of 98%. The carbonation time can be regulated by the dimensions of the drum 36, its inclination and/or its rotation speed. It has been found that a substantial level of carbonation may be achieved in as little as 10 minutes. Although in this particular embodiment the carbonation is carried out continuously, alternatively it would also be possible to carry out batch carbonation instead.

The flue gas exiting the rotating drum 36 through the flue gas exhaust 38 still contains a significant amount of carbon dioxide. Since highly basic process water, with a pH value which can exceed 12, may be effluent, for instance, from the previous crushing and washing of the steel slag, this flue gas can still be used to neutralize such effluent process water.

Since the liquid water contained in the granular material 25 promotes the carbonation of the steel slag particles, the humidity of the flue gas in the drum is preferably controlled so as not to fall below 75%, to prevent drying out the granular material 25. Moreover, this humidity also ensures a more complete hydration of the calcium and magnesium oxides in the steel slag particles to produce the calcium and magnesium hydroxides which then react with the carbon dioxide in the flue gas to form calcium and magnesium carbonates.

Whereas before the carbonation the grains in the granular material 25 are still highly friable, after this carbonation step the calcium and magnesium carbonates bind the slag particles in each grain of the resulting carbonated granular material 26 together, providing significant mechanical strength. More importantly, these carbonates tend to heal the microcracks in the surface of the slag particles, significantly decreasing their ability to absorb additional water, and thus improving the workability of concrete and mortar mixtures incorporating this carbonated granular material 26 as a substitute for, for instance, sand.

The maximum "surface dry" water content of untreated fine steel slag of abovementioned 0-0.5 mm fraction 24 has been measured according to European standard EN 1097-6 (or BS 812: part 2:1975) as being 36 wt. %. That of the same fine slag fraction, carbonated and aggregated, has been measured as 19.5 wt. %. Carbonation thus clearly reduces the water absorption of the steel slag particles.

Comparative tests on the wetting and drying of untreated fine steel slag of abovementioned 0-0.5 mm fraction 24 and the carbonated granular material 26 have also been carried out. In each case, the material has been previously dried, weighed, and placed in a fine layer on a sieve. This sieve has then been submerged under water and the total water content after various periods of time determined by the increase in weight of the wet material. The amount of water adsorbed, that is, retained around and between the loose particles and grains, but not within them, is determined in each case by subtracting, from the highest total water content, the previously measured maximum "surface dry" water content of each material. This resulted in 27 wt. % for the untreated fine fraction 24 and just 5.75 wt. % for the carbonated granular material 26.

After 25 minutes' immersion, the sieve with the wet material has then been placed in each case to dry in a hot air oven at 52° C. The total water content after various periods of time drying was then determined in similar way.

Figure 5:
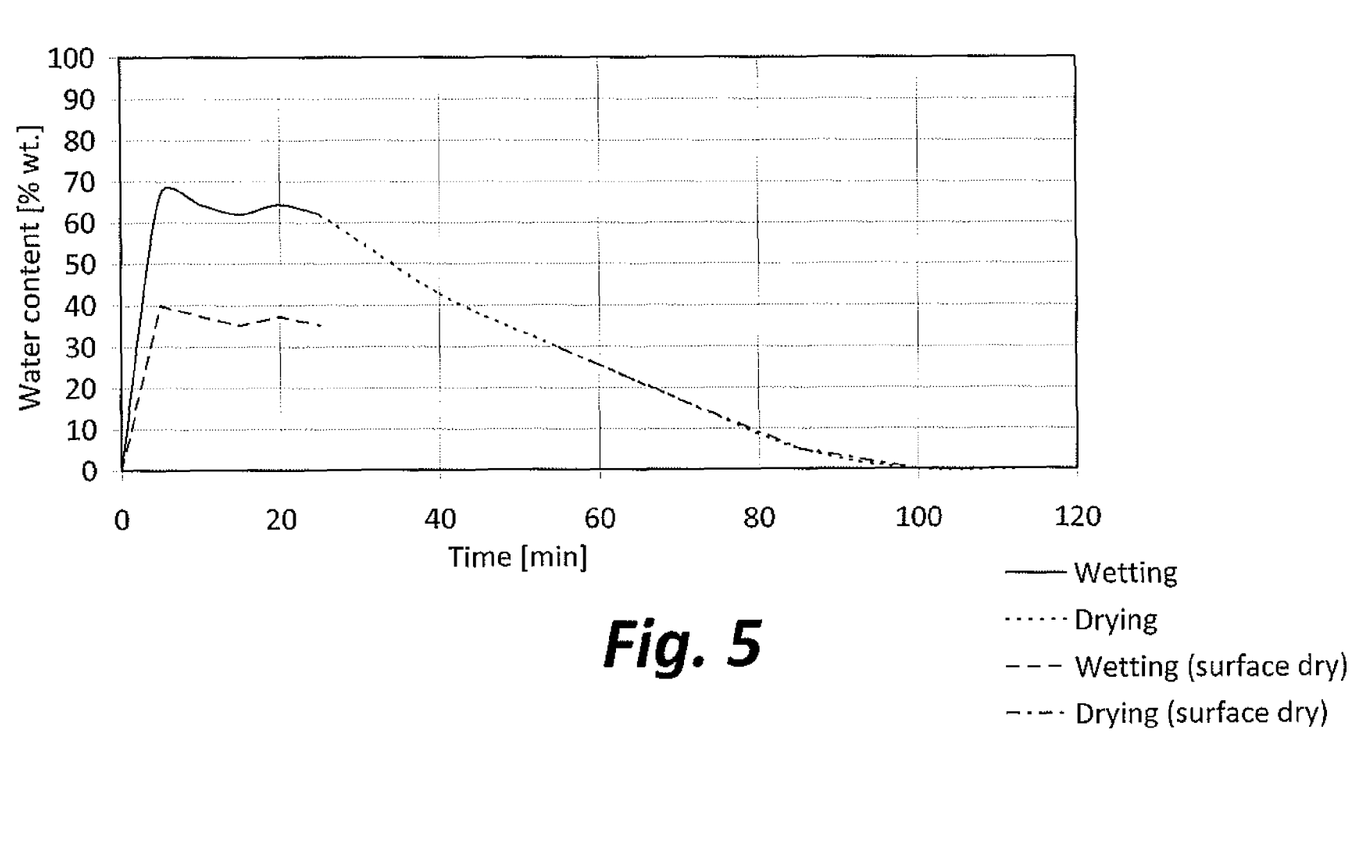
FIG. 5 represents wetting and drying curves for untreated steel slag particles.
Figure 6:
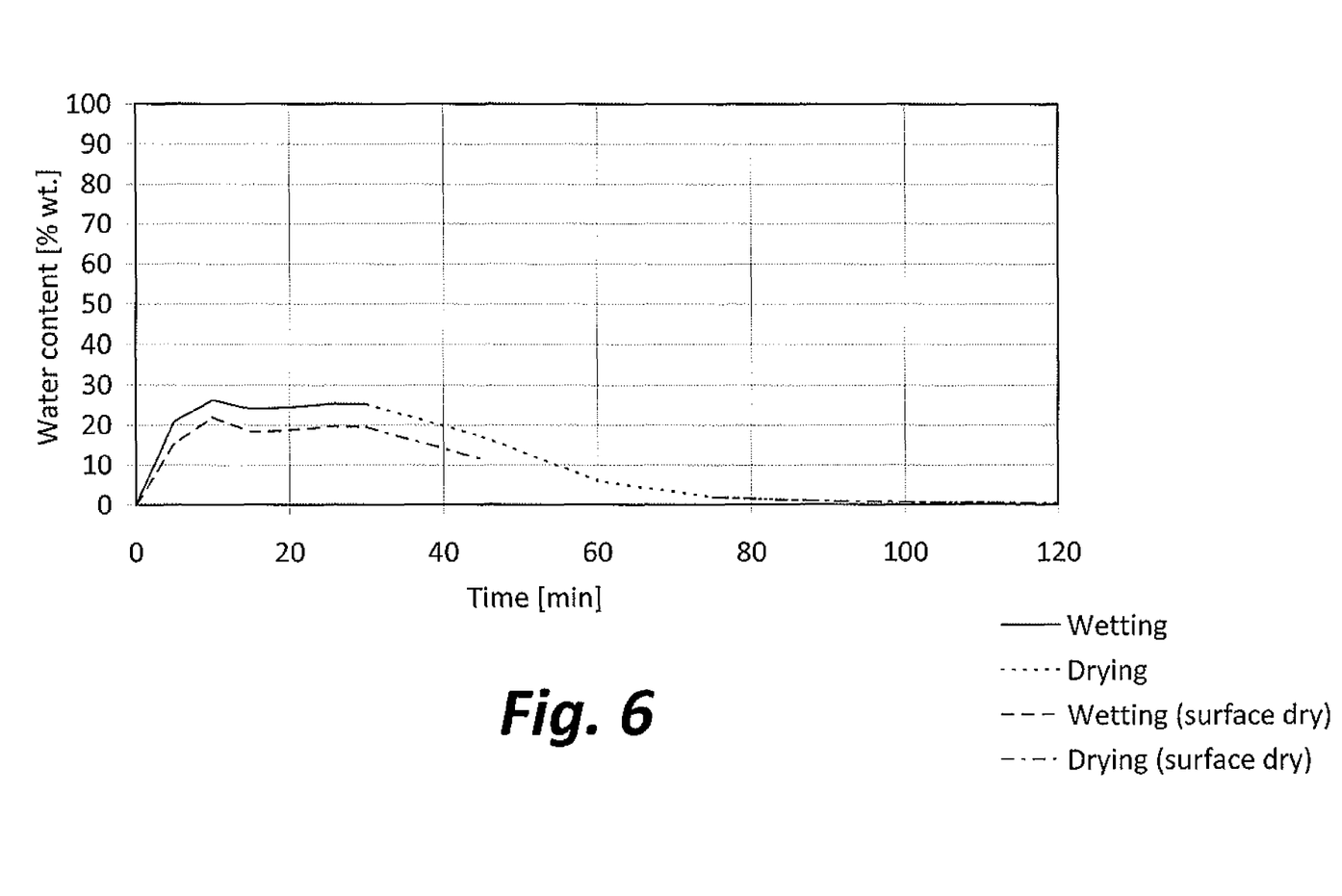
FIG. 6 represents wetting and drying curves for carbonated grains of aggregated steel slag particles.

Tables 6 and 7 show the results of these comparative wetting and drying of, respectively, untreated fine steel slag and the carbonated granular material 26. For each total water content, the "surface dry" equivalent absorbed within the loose particles or grains has been calculated by subtracting from it the previously calculated water content adsorbed onto and between the loose particles and grains. Graphs corresponding to these results are also represented in FIGS. 5 and 6.

TABLE 6

Wetting and drying of untreated steel slag

| | Time [min] | Total water content [wt. %] | "Surface dry" equivalent [wt. %] |
|---|---|---|---|
| Material on 0.5 mm sieve, wetting | 0 | 0.00 | 0 |
| | 5 | 66.85 | 39.85 |
| | 10 | 64.33 | 37.33 |
| | 15 | 62.08 | 35.08 |
| | 20 | 64.33 | 37.33 |
| | 25 | 62.08 | 35.08 |
| Material on 0.5 mm sieve, drying (52° C.) | 25 | 62.08 | 35.08 |
| | 40 | 42.70 | |
| | 55 | 29.78 | 29.78 |
| | 70 | 17.13 | 17.13 |
| | 85 | 5.06 | 5.06 |
| | 100 | 0.00 | 0.00 |
| | 115 | 0.00 | 0.00 |
| | 130 | 0.00 | 0.00 |
| | 145 | 0.00 | 0.00 |

TABLE 7

Wetting and drying of carbonated granular material 26

| | Time [min] | Total water content [wt. %] | "Surface dry" equivalent [wt. %] |
|---|---|---|---|
| Material on 0.5 mm sieve, wetting | 0 | 0.00 | 0 |
| | 5 | 20.89 | 15.14 |
| | 10 | 26.24 | 21.99 |
| | 15 | 24.06 | 18.31 |
| | 20 | 24.46 | 18.71 |
| | 25 | 25.25 | 19.50 |
| | 30 | 25.25 | 19.50 |
| Material on 0.5 mm sieve, drying (52° C.) | 30 | 25.25 | 19.50 |
| | 45 | 17.13 | 11.38 |
| | 60 | 6.04 | |
| | 75 | 1.88 | 1.88 |

TABLE 7-continued

Wetting and drying of carbonated granular material 26

| Time [min] | Total water content [wt. %] | "Surface dry" equivalent [wt. %] |
|---|---|---|
| 90 | 0.89 | 0.89 |
| 105 | 0.50 | 0.50 |
| 120 | 0.30 | 0.30 |
| 135 | 0.30 | 0.30 |
| 150 | 0.30 | 0.30 |

As can be seen in these tables and graphs, apart from the lower water absorption due to carbonation, the carbonated granular material 26, because of its better drainage, also has a much lower water adsorption, considerably reducing its weight increase when wet, as well as the range of variation in total water content. This facilitates its handling and transport considerably. Moreover, the carbonated granular material 26 shows improved heavy metal retention with respect to carbonated, but non-aggregated stainless steel slag particles, as shown by the results of molybdenum and chromium leaching tests according to DIN 38414-S4 carried out on both materials and reproduced on Table 8:

TABLE 8

Heavy metal leaching in carbonated material

| | Mo [mg/l in leachate] | Cr [mg/l in leachate] |
|---|---|---|
| Non-aggregated, carbonated particles | 0.47 | 0.12 |
| Granular material (first test) | 0.20 | 0.12 |
| Granular material (second test) | 0.10 | 0.06 |

Also, the high chemical stability of calcium and magnesium carbonates, compared with calcium and magnesium oxides or hydroxides, ensures the improved durability of the mortar or concrete produced using this carbonated granular material 26.

FIG. 3 shows the grain size distribution curve of this carbonated granular material 26 compared with that of commercially available 0-4 mm porphyry sand 40 for construction. As can be seen in this graph, these materials show very similar grain size distributions. The carbonated granular material 26 has a bulk density of around 1350 kg/m$^3$, which is considerably lower than the bulk density of such sand, which is around 1840 kg/m$^3$. However, this is an advantageous side-effect, which can result in a reduction of transportation costs, as well as of the weight of structures built using the carbonated granular material 26.

To produce mortar, this carbonated granular material 26 is mixed with cement and water. Table 9 shows the compositions of three examples, A, B and C of such mortar and of two comparative examples, D and E, of conventional mortar produced using 0-4 mm porphyry sand. Mortar A comprises water, an ordinary Portland cement (CEM I), and a carbonated granular material 26, produced without addition of barium compounds and carbonated for approximately 3 hours, whereas mortars B and C comprise water, a carbonated granular material 26 produced with addition of barium hydroxide, and, respectively, different types of cement, namely the same ordinary Portland cement (CEM I) as mortar A, and a GGBFS cement (CEM IIIB). The two comparative mortars D and E comprise water, 0-4 mm porphyry sand, and, respectively CEM I, and CEM IIIB. These comparative examples follow the specifications of the EN-196/1 standard, namely, by weight, one part cement, three parts standard sand and half a part water, whereas in the examples containing carbonated granular material 26, the lower density of this carbonated granular material 26 has been taken into account, so that there is only two parts carbonated granular material 26 per part of cement.

TABLE 9

Comparative mortar examples

| MORTAR | CEMENT | WATER/CEM. RATIO (WT.) | SAND/CEM. RATIO (WT.) | GRANULAR MATERIAL/ CEM. RATIO (WT.) |
|---|---|---|---|---|
| A | CEM I | 0.5 | 0 | 2 |
| B | CEM I | 0.5 | 0 | 2 |
| C | CEM IIIB | 0.5 | 0 | 2 |
| D | CEM I | 0.5 | 3 | 0 |
| E | CEM IIIB | 0.5 | 3 | 0 |

After setting, samples of these mortars A, B, C, D and E have been subjected to mechanical resistance tests. Table 10 shows the results of these mechanical tests:

TABLE 10

Bending and compression strength of mortar samples

| MORTAR | BENDING STRENGTH [MPA] | COMPRESSION STRENGTH [MPA] |
|---|---|---|
| A | 3.98 | 31.81 |
| B | 4.85 | 28.09 |
| C | 4.64 | 24.04 |
| D | 9.30 | 49.41 |
| E | 9.52 | 46.97 |

Although the mechanical properties of the samples produced using the carbonated granular material 26 appear to be substantially lower than those of the reference samples, they remain adequate for construction applications where those properties are not critical.

The samples of the mortars A, B and C have also been subjected to molybdenum and chromium leaching tests according to DIN 38414-S4. Table 11 shows the results of these tests:

TABLE 11

Molybdenum and chromium leaching under DIN 38414-S4

| MORTAR | MOLYBDENUM [MG/L] | CHROMIUM [MG/L] |
|---|---|---|
| A | 0.10 | <0.10 |
| B | <0.10 | <0.10 |
| C | 0.14 | <0.10 |

As can be seen from these results, the samples containing the carbonated granular material 26 present very good chromium and molybdenum retention characteristics, apt to satisfy even some of the most stringent environmental regulations. Whether barium compounds are used or not, these retention properties can also be improved by buffering the pH of the carbonated steel slag particles, so that it remains between 12 and 13. Leaching tests have been carried out on finely ground samples of mortar A in aqueous solutions of increasing acidity. In each test, 10 grams of finely ground mortar have been added to 100 ml of aqueous solution and shaken for 24 hours in a vibrating table. To decrease the pH of the mixture, aqueous solutions with increasing concentrations of nitric acid ($HNO_3$) have been applied.

TABLE 12

Leachate of mortar A under increasing acidity conditions

| % acid (vol.) | pH | B | Na | Mg | K | Ca | Cr | Mo | Ba |
|---|---|---|---|---|---|---|---|---|---|
| | | | | mg/l in leachate | | | | | |
| 0 | 12.42 | 8.84 | 86.30 | 0.00 | 129.80 | 430 | 0.05 | 0.04 | |
| 1 | 12.00 | 8.66 | 120.90 | 0.00 | 191.40 | 2994 | 0.13 | 0.15 | 4.81 |
| 3 | 10.79 | 20.93 | 136.80 | 0.00 | 153.60 | 8025 | 0.50 | 0.30 | 4.11 |
| 6 | 8.62 | 53.60 | 149.90 | 265.75 | 154.85 | 17295 | 0.44 | 0.90 | 5.91 |
| 9 | 7.85 | 111.0 | 223.30 | 1894.5 | 179.35 | 27285 | 0.03 | 1.26 | |
| 12 | 3.30 | 255.2 | 283.75 | 4111.0 | 290.70 | 50050 | 4.32 | 0.02 | |
| 13 | 1.93 | 275.5 | 143.05 | 1101.0 | 185.50 | 14510 | 69.10 | 1.50 | |

Table 12 thus shows how it is preferable to maintain a high pH in the mortar or concrete produced using the method of the invention. This can be achieved, for instance, by dissolving sodium and/or potassium hydroxides in the water 34 before its use in the aggregation step, and this in a concentration, for example, of about 0.05-0.5 mole/l, preferably 0.1-0.2 mole/l, and/or by using a basic process water effluent resulting, for instance, from slag treatment.

Another possibility is the addition of a small amount, for instance 5 wt. %, of hydraulic binder, in particular of ordinary Portland cement, such as, for example, the abovementioned CEM I cement, to the steel slag particles of the fine fraction 24 prior to and/or during the aggregation step. Not only does this improve the mechanical properties of the resulting granular material, but also, due to the alkalinity of ordinary Portland cement, it also has an additional buffer action, and it also turns out to have an additional positive effect in reducing the leaching of both chromium and molybdenum.

Although the present invention has been described with reference to specific exemplary embodiments, it will be evident that various modifications and changes may be made to these embodiments without departing from the broader scope of the invention as set forth in the claims. For instance, the water content resulting in the maximum packing density may be determined by alternative tests, such as, for instance, the "Modified Proctor" test, ASTM D1557/AASHTO T180, also incorporated by reference, which uses the same mould, but different compaction parameters, or other related tests using different moulds, compaction methods, or measuring systems. The carbonation could be also carried out using a chemical agent other than carbon dioxide, or in a state other than gaseous. In order to extract fine metal inclusions, the fine fraction of slag particles may also be more finely ground before the aggregation step. Said aggregation step may also be carried out by other means than the disc or pan pelletizer described hereabove, such as, for instance, a pelletisation press. To decrease the concentration of chromium (VI) in the slag particles, a reducing agent, such as, for example, iron (II) sulphate, in particular heptahydrated iron (II) sulphate ($FeSO_4.7H_2O$), may also be added to the slag particles. The duration of the carbonation may be adjusted according to the circumstances, and the carbonation be carried out using different equipment than the rotating drum described hereabove. Accordingly, the description and drawings are to be regarded in an illustrative sense rather than a restrictive sense.

The invention claimed is:

1. A process for producing a granular material for mixing with at least a hydraulic binding agent and with water to produce mortar or concrete, wherein the process comprises:

an aggregation step, wherein solid steel slag particles having sizes not larger than 4 mm and containing γ-dicalcium silicate are aggregated into larger grains so as to form a granular material; and, following said aggregation step, a carbonation step wherein the aggregated steel slag particles in said granular material are carbonated by exposure to carbon dioxide so as to produce a carbonated granular material, the grains of which contain said solid steel slag particles bound to one another by a solid matrix containing carbonates formed during the carbonation step.

2. The process according to claim 1, wherein the water content of said larger grains during the aggregation step is controlled, so that, at the end of said aggregation step, it is within a range of 5 wt. % above or below the water content resulting in a maximum dry density in a Proctor compaction test performed in accordance with ASTM D698/AASHTO T99 on the particles used to produce the larger grains.

3. The process according to claim 1, wherein the steel slag particles have sizes not larger than 3 mm.

4. The process according to claim 3, wherein the grains have sizes smaller than 25 mm.

5. The process according to claim 4, wherein the larger grains have sizes smaller than 20 mm.

6. The process according to claim 1, wherein said granular material is agitated during said carbonation step.

7. The process according to claim 1, wherein a hydraulic binder is added to said steel slag particles prior to or during said aggregation step.

8. The process according to claim 1, wherein said carbonation step is performed in a continuous counter current flow process.

9. The process according to claim 1, wherein the carbonated granular material contains at least 2 wt. % of carbonates produced during the carbonation step.

10. The process according to claim 1, wherein said carbonation is carried out using a gas comprising at least 5 vol. % of carbon dioxide.

11. The process according to claim 10, wherein the gas is subsequently used to lower the pH of an effluent water having a pH higher than 11.

12. The process according to claim 10, wherein the gas comprises less than 30 vol. % of carbon dioxide.

13. The process according to claim 10, wherein the carbonation step is performed at a temperature of between 10 and 100° C.

14. The process according to claim 10, wherein the carbonation step is performed at a pressure lower than 10 bars.

15. The process according to claim 1, wherein said steel slag particles are stainless steel slag particles.

16. The process according to claim 1, wherein said stainless steel slag particles comprise at least 100 ppm of molybdenum.

17. The process according to claim 1, wherein a water soluble barium compound is added to the steel slag particles prior to the carbonation step.

18. The process according to claim 1, wherein a base is added to the steel slag particles prior to said carbonation step in order to counteract an increased acidity due to the carbonation step.

19. The process according to claim 1, wherein the steel slag particles contain at least 3 wt. % of v-dicalcium silicate.

20. A process for producing mortar or concrete by mixing a carbonated granular material prepared according to claim 1 with a hydraulic binding agent and with water.

21. The process according to claim 15, wherein said stainless steel slag particles comprise at least 3000 ppm of chromium.

22. The process according to claim 1, wherein a hydraulic binder is added to said steel slag particles prior to and during said aggregation step.

\* \* \* \* \*